US012640372B2

(12) United States Patent
Watanabe et al.

(10) Patent No.: US 12,640,372 B2
(45) Date of Patent: May 26, 2026

(54) NON-AQUEOUS ELECTROLYTE SECONDARY BATTERY

(71) Applicant: SANYO Electric Co., Ltd., Kadoma (JP)

(72) Inventors: Kensuke Watanabe, Hyogo (JP); Taiki Nonaka, Hyogo (JP); Akira Nishida, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 880 days.

(21) Appl. No.: 17/798,461

(22) PCT Filed: Jan. 29, 2021

(86) PCT No.: PCT/JP2021/003124

§ 371 (c)(1),
(2) Date: Aug. 9, 2022

(87) PCT Pub. No.: WO2021/161801

PCT Pub. Date: Aug. 19, 2021

(65) Prior Publication Data

US 2023/0047916 A1      Feb. 16, 2023

(30) Foreign Application Priority Data

Feb. 14, 2020     (JP) ................................. 2020-023483

(51) Int. Cl.
*H01M 4/62*          (2006.01)
*H01M 4/02*          (2006.01)
(Continued)

(52) U.S. Cl.
CPC ............. *H01M 4/624* (2013.01); *H01M 4/13* (2013.01); *H01M 50/461* (2021.01); *H01M 2004/028* (2013.01)

(58) Field of Classification Search
None
See application file for complete search history.

(56) References Cited

U.S. PATENT DOCUMENTS 2,379,976 A * 7/1945 Maddock ................. H01B 1/24
252/511
6,225,010 B1   5/2001 Hamano et al.
(Continued)

FOREIGN PATENT DOCUMENTS

CA        2 306 360 A1    10/2000
CN    110581253 A  * 12/2019
(Continued)

OTHER PUBLICATIONS

Machine translation of CN11081253, published on Dec. 17, 2019 (Year: 2019).*

(Continued)

*Primary Examiner* — Anca Eoff
(74) *Attorney, Agent, or Firm* — WHDA, LLP

(57) ABSTRACT

This non-aqueous electrolyte secondary battery comprises: a separator that has an adhesive on at least one surface thereof; and an electrode that has a core and an electrode mix layer, and that is configured so that the electrode mix layer abuts the adhesive. The electrode mix layer is configured so that the density, in the thickness-direction, of a porous body increases from the core towards the adhesive.

5 Claims, 4 Drawing Sheets

(51) Int. Cl.
   *H01M 4/13*        (2010.01)
   *H01M 50/46*     (2021.01)

(56)              References Cited

U.S. PATENT DOCUMENTS

| | | | | |
|---|---|---|---|---|
| 2006/0088762 A1* | 4/2006 | Okamoto | .............. | H01M 50/46 |
| | | | | 429/185 |
| 2015/0311490 A1 | 10/2015 | Murase et al. | | |
| 2018/0006291 A1* | 1/2018 | Kim | ....................... | H01M 4/13 |

FOREIGN PATENT DOCUMENTS

| | | | |
|---|---|---|---|
| JP | 2000-306569 A | 11/2000 | |
| JP | 20001-84985 A | 3/2001 | |
| JP | 2015-99788 A | 5/2015 | |
| JP | 2015144079 A | 8/2015 | |
| JP | 2017-162699 A | 9/2017 | |
| JP | 2019-192340 A | 10/2019 | |
| WO | 99/26306 A1 | 5/1999 | |
| WO | 99/48164 A1 | 9/1999 | |
| WO | 2014/081035 A1 | 5/2014 | |
| WO | WO-2018027652 A1 * | 2/2018 | .......... H01M 50/489 |

OTHER PUBLICATIONS

Machine translation of WO 2018/027652 A, published on Feb. 15, 2018 (Year: 2018).*

Office Action dated Mar. 27, 2025, issued in counterpart CN Application No. 202180013969.0, with partial English translation. (8 pages).

International Search Report dated Apr. 20, 2021, issued in counterpart International Application No. PCT/JP2021/003124, with English Translation (5 pages).

\* cited by examiner

NON-AQUEOUS ELECTROLYTE SECONDARY BATTERY

CROSS-REFERENCE TO RELATED APPLICATIONS

This application is a national stage of International Application No.PCT/JP2021/003124, filed Jan. 29, 2021, which claims priority to Japanese Patent Application No. 2020-023483 filed Feb. 14, 2020 both of which are hereby incorporated by reference in their entirety.

TECHNICAL FIELD

The present disclosure generally relates to a non-aqueous electrolyte secondary battery.

BACKGROUND ART

In recent years, demand for secondary batteries has increased in various fields. In particular, lithium-ion secondary batteries as non-aqueous electrolyte secondary batteries using a non-aqueous electrolyte have attracted attention because of availability of high energy density. In this type of secondary battery, pluralities of positive electrode plates and negative electrode plates are stacked with separators interposed therebetween to form a flat electrode assembly, and inserted in an outer jacket. In the positive electrode plate, positive electrode mixture layers are provided on both surfaces of a positive electrode core. In the negative electrode plate, negative electrode mixture layers are provided on both surfaces of a negative electrode core. Each of a positive electrode active material and a negative electrode active material has a structure capable of absorbing and desorbing lithium ions. The separator, which is a porous substance, may permeate lithium ions, and prevents a short circuit due to an electric contact between the positive electrode plate and the negative electrode plate.

Each of the positive electrode plate and the negative electrode plate is electrically connected to a current collector plate, and inserted in an outer jacket. The outer jacket is sealed after an electrolyte liquid is injected. In this secondary battery, an adhesive layer is provided on a surface of the separator so as not to collapse the shape of the electrode assembly with a load during transportation, and thermocompression bonding is performed to achieve adhesion between the positive electrode plate and the separator and between the negative electrode plate and the separator.

Patent Literature 1 discloses that a separator with an adhesive layer and an electrode are subjected to thermocompression bonding to manufacture an electrode-separator stacked body. Disclosed are a method of manufacturing the electrode-separator stacked body, which has a purpose of adhering the separator and the electrode with a sufficient adhesion strength, including a step of stacking the separator with the adhesive layer made of a porous polyolefin film having the adhesive layer on at least one surface and the electrode having an electrode active material layer including an electrode active material and an electrode binder so that the adhesive layer and the electrode active material layer are contacted to perform thermocompression bonding. Patent Literature 1 discloses that: the adhesive layer includes a particulate polymer A having a glass transition temperature of −50 to 5° C. and a particulate polymer B having a glass transition temperature of 50 to 120° C.; the adhesive layer has an average thickness of 0.2 to 1.0 μm; and the thermocompression bonding is performed at 50 to 100° C.

CITATION LIST

Patent Literature

PATENT LITERATURE 1: International Publication No. 2014/081035

SUMMARY

Use of such a plurality types of particulate polymers having different glass transition temperatures to improve the adhesion strength between the separator and the electrode unfortunately increases the cost for that.

A non-aqueous electrolyte secondary battery according to the present disclosure is a non-aqueous electrolyte secondary battery, comprising: a separator having an adhesive on at least one surface; and an electrode having a core and an electrode mixture layer, the electrode mixture layer contacting the adhesive, wherein in the electrode mixture layer, a concentration of a porous material in a thickness direction increases from the core to the adhesive.

In the non-aqueous electrolyte secondary battery according to the present disclosure, the concentration of the porous material in the electrode mixture layer is not uniform in the thickness direction but regulated to increase from the core to the adhesive. That is, the concentration of the porous material is relatively high near the surface of the electrode mixture layer contacting the adhesive of the separator. Thus, adhering the porous material and the adhesive in the thermocompression bonding step allows more adhesive to enter pores of the porous material, resulting in a dominantly developed anchor effect.

In an embodiment of the present disclosure, in the electrode mixture layer, a proportion of the porous material within a range of 5 μm from a surface of the electrode mixture layer on a side of the adhesive is 50% or more.

In another embodiment of the present disclosure, the electrode mixture layer is a positive electrode mixture layer including a positive electrode active material, and the porous material is a conductive agent.

According to the present disclosure, the adhesion strength between the separator and the electrode may be improved without change in a material constitution such that the adhesive is constituted with a plurality types of polymers.

DESCRIPTION OF EMBODIMENTS

Figure 1:
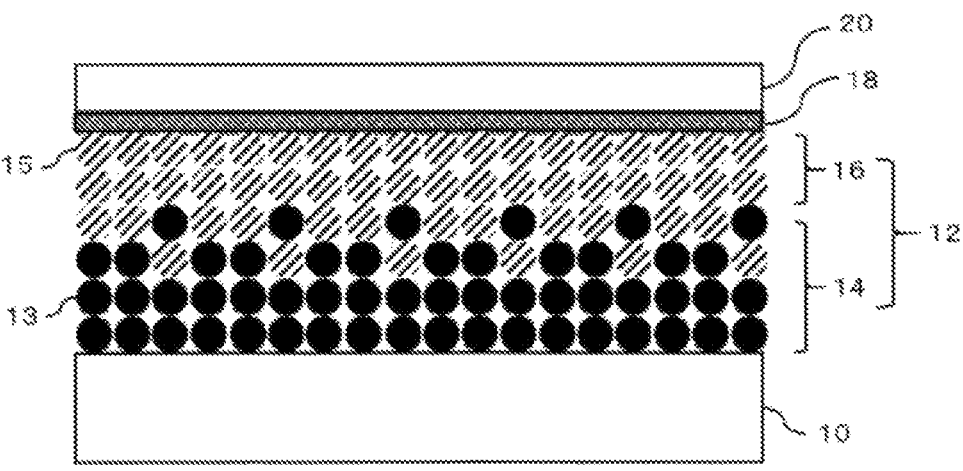
FIG. 1 is a view of a constitution of a non-aqueous electrolyte secondary battery of an embodiment.

Embodiments according to the present disclosure will be described below based on the drawings.

First, a summary of a rectangular secondary battery will be described. The rectangular secondary battery according to an embodiment of the present disclosure (hereinafter, simply referred to as a secondary battery) comprises: an electrode assembly; an electrolyte; an outer jacket housing the electrode assembly and the electrolyte; and a sealing plate to which a positive electrode terminal and a negative electrode terminal are attached and sealing an opening of the outer jacket. The electrode assembly has a structure in which a positive electrode and a negative electrode are alternately stacked with a separator interposed therebetween. The outer jacket is, for example, a metal rectangular container having a flat, substantially parallelepiped shape and having one opened end in the height direction. The outer jacket and the sealing plate are made of, for example, a metal material mainly composed of aluminum.

The electrolyte is preferably a non-aqueous electrolyte, and includes, for example, a non-aqueous solvent and an electrolyte salt dissolved in the non-aqueous solvent. As the non-aqueous solvent, an ester, an ether, a nitrile, an amide, or a mixed solvent of two or more thereof may be used, for example. The non-aqueous solvent may contain a halogen-substituted derivative in which at least a part of hydrogen atoms in any of these solvents is substituted with a halogen atom such as fluorine. As the electrolyte salt, a lithium salt such as $LiPF_6$ is used, for example.

The positive electrode terminal and the negative electrode terminal are attached to the sealing plate. The sealing plate has a long, rectangular shape. The positive electrode terminal is disposed on one end side in the longitudinal direction, and the negative electrode terminal is disposed on the other end side in the longitudinal direction of the sealing plate. The positive electrode terminal and the negative electrode terminal are external connection terminals electrically connected to another secondary battery or a load, and are attached to the sealing plate with an insulating member interposed therebetween.

The positive electrode includes a positive electrode tab electrically connected to the positive electrode terminal, and the negative electrode includes a negative electrode tab electrically connected to the negative electrode terminal. The positive electrode terminal is electrically connected to a positive electrode tab group in which a plurality of the positive electrode tabs are stacked with positive electrode current collector plates interposed therebetween. The negative electrode terminal is electrically connected to a negative electrode tab group in which a plurality of the negative electrode tabs are stacked with negative electrode current collector plates interposed therebetween. Provided on the sealing plate are a liquid injecting part to inject the non-aqueous electrolyte liquid and a gas discharge vent to open and discharge gas with abnormality of the battery.

The electrode assembly is divided into, for example, a first electrode group and a second electrode group. These electrode groups have the same stacking structure and size, and stacked and disposed in the thickness direction of the electrode assembly. The positive electrode tab group constituted with a plurality of the positive electrode tabs and the negative electrode tab group constituted with a plurality of the negative electrode tabs are formed on an upper end part of each of the electrode group, and connected to each of the current collector plates of the sealing plate. An outer circumferential surface of these electrode groups is covered with the separator, and these electrode groups are configured so that the battery reaction each independently occurs.

The electrode assembly includes a plurality of the positive electrodes and a plurality of the negative electrodes. The electrode group constituting the electrode assembly includes, for example, one more negative electrodes than the positive electrodes, and the negative electrodes are disposed on both sides in the thickness direction of the electrode group. A separator is disposed between a positive electrode and a negative electrode, but a single separator may be included in each of the electrode groups. Each of the electrode groups includes an adhesive layer, and produced by using a thermocompression bonding step. More specifically, each of the electrode groups is produced by pressing a stacked body in which the plurality of the positive electrodes and the plurality of the negative electrodes are alternately stacked one by one with the separator interposed therebetween in the stacking direction using a pair of heating plates for applying heat and pressure to the stacked body to allow at least a part of the adhesive layer to develop an adhesion strength.

The positive electrode has a positive electrode core and a positive electrode mixture layer provided on a surface of the positive electrode core. As the positive electrode core, a foil of a metal stable within a potential range of the positive electrode, such as aluminum or an aluminum alloy, a film having such a metal disposed on a surface layer thereof, or the like may be used. The positive electrode mixture layer includes a positive electrode active material, a conductive agent, and a binder, and is preferably provided on both surfaces of the positive electrode core. The positive electrode may be produced by, for example, coating a positive electrode mixture slurry including the positive electrode active material, the conductive agent, the binder, and the like on the positive electrode core, drying and subsequently compressing the coating film to form the positive electrode mixture layers on both the surfaces of the positive electrode core.

The positive electrode has a structure in which the positive electrode mixture layer made of a positive electrode mixture is disposed on an entire region of a portion of the surface of the positive electrode core excluding the positive electrode tab (hereinafter, referred to as "base"). A thickness of the positive electrode core is, for example, 5 μm to 20 μm, and preferably 8 μm to 15 μm. The base of the positive electrode core has a rectangular shape as viewed from the front side, and the positive electrode tab projects from one side of the rectangle. Typically, processing one metal foil may yield the positive electrode core in which the base and the positive electrode tab are integrally formed.

For the positive electrode active material, a lithium-transition metal composite oxide is used. Examples of metal elements contained in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, and Mn is preferably contained. A preferable example of the composite oxide is a lithium-transition metal composite oxide containing Ni, Co, and Mn, or a lithium-transition metal composite oxide containing Ni, Co, and Al.

Examples of the conductive agent included in the positive electrode mixture layer may include a carbon material such as carbon black, acetylene black, Ketjenblack, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide resin, an acrylic resin, and a polyolefin resin. With these resins, a cellulose derivative such as carboxymethyl cellulose (CMC) or a salt thereof, polyethylene oxide (PEO), and the like may be used in combination.

The negative electrode has a negative electrode core and a negative electrode mixture layer provided on a surface of the negative electrode core and made of a negative electrode mixture. As the negative electrode core, a foil of a metal stable within a potential range of the negative electrode, such as copper, a film having such a metal disposed on a surface layer thereof, or the like may be used. The negative electrode mixture layer includes a negative electrode active material and a binder, and is preferably provided on both surfaces of the negative electrode core. The negative electrode may be produced by, for example, coating a negative electrode mixture slurry including the negative electrode active material, the binder, and the like on the surface of the negative electrode core, drying and subsequently compressing the coating film to form the negative electrode mixture layers on both the surfaces of the negative electrode core.

The negative electrode has a structure in which the negative electrode mixture layer is formed on the entire region of the base, which is a portion of the surface of the negative electrode core excluding the negative electrode tab. A thickness of the negative electrode core is, for example, 3 µm to 15 µm, and preferably 5 µm to 10 µm. As with the positive electrode, the base of the negative electrode core has a rectangular shape as viewed from the front side, and the negative electrode tab projects from one side of the rectangle. Typically, processing one metal foil may yield the negative electrode core in which the base and the negative electrode tab are integrally formed.

For the negative electrode active material, a carbon-based active material that reversibly absorbs and desorbs lithium ions is used, for example. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used as with the positive electrode, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

The above is a summary of the rectangular secondary battery. Next, a structure of the electrode group and the separator in the present embodiment will be further described.

FIG. 1 is an enlarged schematic cross-sectional view of the electrode group when the stacking direction is cut with a plane substantially perpendicular to the height direction, and is an enlarged schematic cross-sectional view including a part of the separator, a part of the positive electrode, and the adhesive layer.

As illustrated in FIG. 1, the separator 20 has a substrate, and further has the adhesive 18 on at least one surface, and preferably on both surfaces (for convenience of description, FIG. 1 illustrates a case of the adhesive 18 provided on the only one surface). The substrate is formed of a porous sheet having ion permeabilities and insulation properties. The separator 20 may be formed of a porous substrate having a main component of at least one selected from a polyolefin, polyvinylidene fluoride, polytetrafluoroethylene, a polyimide, a polyamide, a polyamide imide, a polyether sulfone, a polyether imide, and aramid, for example. The separator 20 is preferably made of a polyolefin, and particularly preferably made of polyethylene and polypropylene.

The adhesive 18 is formed by disposing a plurality of dots of adhesive (dot-shaped portions) so as to have a substantially constant area density of dots on at least one of one entire surface of the separator 20 and the other entire surface of the separator 20 by processing such as coating. The form of coating of the adhesive 18 may not be the form of dot-shaped coating, but may be a form of coating on the entire surface of the separator. That is, the adhesive 18 may be disposed so as to have a substantially constant area density of dots on at least one of one entire surface of the separator and the other entire surface of the separator, and may be configured to provide the adhesive layer on at least one surface of the separator. As the adhesive 18, known materials such as, for example, an acrylic resin-based adhesive, a urethane resin-based adhesive, an ethylene-vinyl acetate resin-based adhesive, and an epoxy resin-based adhesive may be used.

The positive electrode and the negative electrode are alternately stacked with the separator 20 interposed therebetween so that the one surface of the separator 20 on which the adhesive 18 is disposed faces the positive electrode to form a stacked body. Thereafter, a part of the adhesive is softened by applying pressure and heat to the stacked body from both sides in the stacking direction with heating plates disposed on one side and on the other side in the stacking direction. The above procedure adheres the separator 20 and the positive electrode with the adhesive, and adheres the separator 20 and the negative electrode with the adhesive to prevent a short circuit due to a position shift of each of the positive electrode, the negative electrode, and the separator 20. To prevent a short circuit between the positive electrode and the negative electrode, a heat-resistant layer is disposed on any of the positive electrode, the negative electrode, and the separator. The heat-resistant layer includes inorganic particles such as aluminum oxide, and constituted with, for example, a ceramic heat-resistant layer or the like.

As illustrated in FIG. 1, the positive electrode has a positive electrode core 10 and a positive electrode mixture layer 12 provided on a surface of the positive electrode core 10. The positive electrode mixture layer 12 includes a positive electrode active material, a conductive agent, and a binder. The positive electrode mixture layer 12 may be produced by, for example, coating a positive electrode mixture slurry including the positive electrode active material, the conductive agent, the binder, and the like on the positive electrode core 10, and drying and subsequently compressing the coating film to form the positive electrode mixture layer 12 on the surface of the positive electrode core 10. The positive electrode mixture layer 12 of the present embodiment is composed of a layer 14 having a relatively low concentration of the porous material and a layer 16 having a relatively high concentration of the porous material. In other words, the concentration of the porous material in the positive electrode mixture layer 12 is not uniform but nonuniform in the thickness direction. The positive electrode mixture layer 12 is constituted so that the concentration of the porous material increases from the positive electrode core 10 to the adhesive 18, and in contrast, constituted so that the concentration of the porous material decreases from the adhesive 18 to the positive electrode core 10. In FIG. 1, a non-porous material 13 is schematically illustrated as a black circle, and a porous material 15 is illustrated as a hatched circle. It can be mentioned that the positive electrode mixture layer 12 has a relatively high concentration of the porous material 15 on the adhesive 18 side, and has a relatively high concentration of the non-porous material 13 on the positive electrode core 10 side. Alternatively, it can be mentioned that the porous material is unevenly distributed on the adhesive 18 side in the positive electrode mixture layer 12.

As mentioned above, the positive electrode mixture layer 12 includes the positive electrode active material, the conductive agent, and the binder. As the positive electrode active material, a lithium-transition metal composite oxide is used. Examples of the conductive agent may include a carbon material such as carbon black, acetylene black, Ketjenblack, and graphite. Examples of the binder may include a fluororesin such as polytetrafluoroethylene (PTFE) and polyvinylidene fluoride (PVdF), polyacrylonitrile (PAN), a polyimide resin, an acrylic resin, and a polyolefin resin. Among them, acetylene black is a typical example of the porous material. Thus, as an example, a concentration of acetylene black as the conductive agent included in the positive electrode mixture layer 12 is nonuniformly distributed in the thickness direction, and the concentration of the acetylene black is increased from the positive electrode core 10 to the adhesive 18 to be able to constitute the positive electrode mixture layer 12 so that the concentration of the porous material increases from the positive electrode core 10 to the adhesive 18.

Figure 2A:
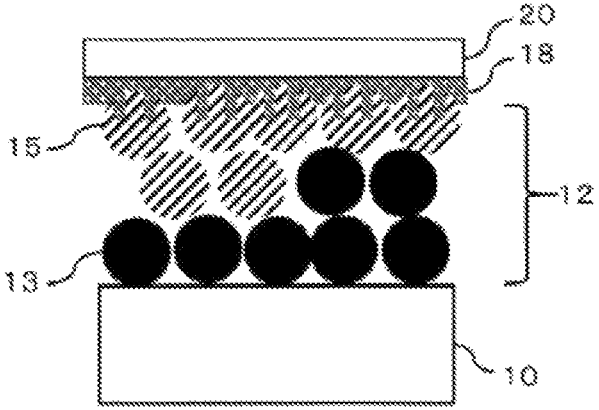
FIG. 2A is a view illustrating adhesion of a non-aqueous electrolyte secondary battery of an embodiment.

FIG. 2A schematically illustrates an adhering state between the positive electrode and the separator 20 in the present embodiment. The positive electrode mixture layer 12 and the adhesive 18 are contacted. Applying pressure and heat to the stacked body in this state from both the sides in the stacking direction softens the adhesive 18 to allow the softened adhesive 18 to enter pores of the porous material 15, resulting in a dominantly developed anchor effect to improve the adhesion strength between the positive electrode and the separator 20.

Figure 2B:
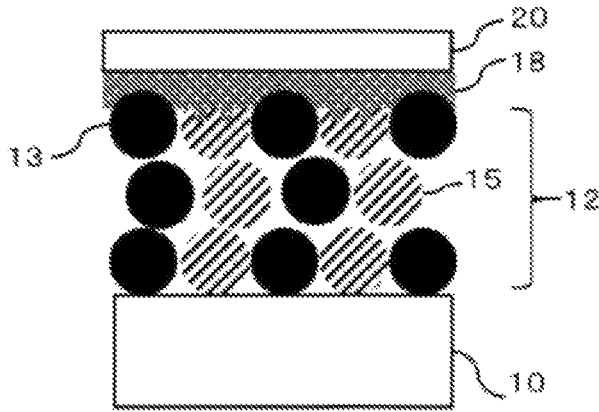
FIG. 2B is a view illustrating adhesion of a conventional non-aqueous electrolyte secondary battery.

On the other hand, FIG. 2B schematically illustrates a conventional adhering state between the positive electrode and the separator 20 in the positive electrode mixture layer 12 with a uniform concentration of the porous material in the thickness direction. The positive electrode mixture layer 12 and the adhesive 18 are contacted, and applying pressure and heat to the stacked body in this state from both the sides in the stacking direction softens the adhesive 18. The softened adhesive 18, however, is difficult to enter pores of the porous material 15 (in other words, the non-porous material 13 inhibits the anchor effect of the porous material 15), and the anchor effect is not dominantly developed. The adhesion strength has a positive correlation with the concentration of the porous material on a surface side contacting with the adhesive 18 of the positive electrode mixture layer 12, and a higher concentration of the porous material results a larger adhesion strength.

The above relates to the adhesion strength between the positive electrode and the separator 20, but the same applies to an adhesion strength between the negative electrode and the separator 20. That is, a concentration of a porous material included in the negative electrode mixture layer is made nonuniform in the thickness direction to increase the concentration of the porous material from the negative electrode core to the adhesive 18. Applying pressure and heat to the stacked body in this state from the both sides in the stacking direction softens the adhesive 18 to allow the softened adhesive 18 to enter the pores of the porous material, resulting in a dominantly developed anchor effect to improve the adhesion strength between the negative electrode and the separator 20. Therefore, at least any of the positive electrode and the negative electrode may be constituted so that the concentration of the porous material in the thickness direction of the electrode mixture layer increases from the electrode core to the adhesive.

Examples will be described below.

EXAMPLES

Figure 3:
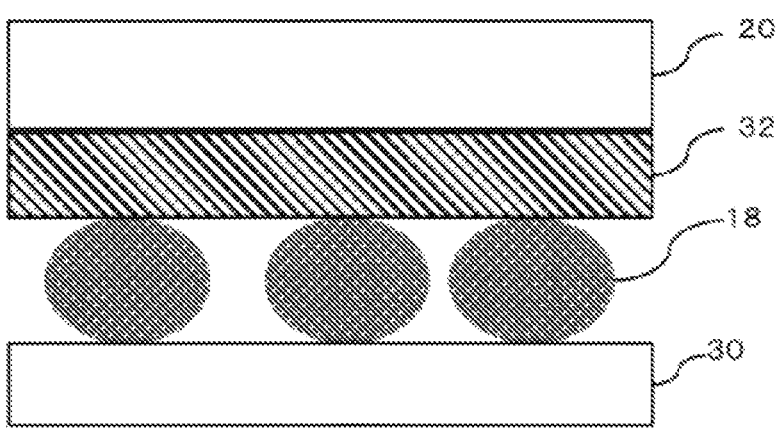
FIG. 3 is a view of a constitution of an evaluation method of an adhesion strength of a non-aqueous electrolyte secondary battery of an embodiment.

FIG. 3 illustrates an evaluation method of the adhesion strength in the Examples.

First, a separator 20 and a positive electrode 30 are provided. The separator 20 has a heat-resistant layer 32, and further has an adhesive 18. The adhesive 18 is formed by disposing a plurality of dots of adhesive 18 so as to have a substantially constant area density of dots by processing such as coating on one entire surface of the separator 20 on which the heat-resistant layer 32 is provided. The positive electrode 30 has a positive electrode mixture layer. The adhesive 18 of the separator 20 is contacted with the positive electrode mixture layer of the positive electrode 30, and the separator 20 and the positive electrode 30 are pressed under predetermined conditions by using a pair of heating plates to apply heat and pressure, resulting in a state where the adhesive 18 develops the adhesion strength. After cooling, the separator 20 is removed to transfer the heat-resistant layer 32 to the positive electrode mixture layer of the positive electrode 30. The adhesion strength between the heat-resistant layer 32 of the separator 20 and a substrate is weaker than the adhesion strength between the positive electrode 30 and the adhesive. Thus, when the separator 20 is removed from the positive electrode 30, an adhered part in the adhesive 18 is not removed from the positive electrode 30 and the heat-resistant layer 32, and the heat-resistant layer 32 is removed from the substrate.

Figure 4A:
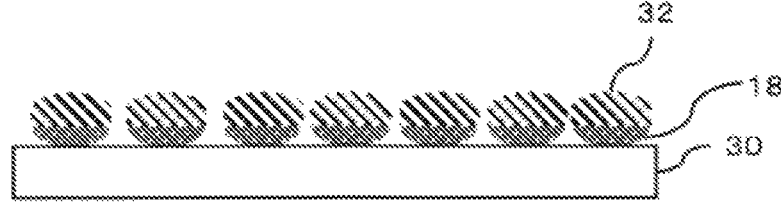
FIG. 4A is a view (part 1) illustrating an evaluation method of an adhesion strength of a non-aqueous electrolyte secondary battery of an embodiment.

FIG. 4A schematically illustrates transferring the heat-resistant layer 32 to the positive electrode mixture layer of the positive electrode 30. The adhesive 18 and the heat-resistant layer 32 are transferred as a dot shape to the positive electrode mixture layer of the positive electrode 30. When the adhesive 18 has a relatively high adhesion strength, the heat-resistant layer 32 is transferred. Whereas, when the adhesive 18 has a relatively low adhesion strength, the heat-resistant layer 32 is not transferred. Therefore, evaluating the number of the transferred heat-resistant layer 32 or a concentration of the transferred heat-resistant layer 32 can quantitatively evaluate the adhesion strength.

Figure 4B:
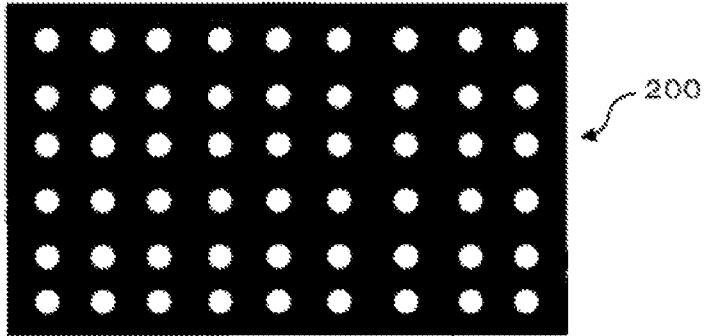
FIG. 4B is a view (part 2) illustrating an evaluation method of an adhesion strength of a non-aqueous electrolyte secondary battery of an embodiment.

FIG. 4B schematically illustrates a binarized image of a photograph obtained by removing the separator 20 from the positive electrode 30 to photograph a surface on the positive electrode 30 from which the separator 20 is removed, with a camera, a scanner, or the like. In FIG. 4B, a black indicates the positive electrode mixture layer and a dot-shaped white circle indicates the transferred heat-resistant layer 32, that is, a transferred trace. In such a binarized image, the adhesion strength between the separator 20 and the positive electrode 30 is quantitatively evaluated by calculating a concentration of the transferred trace with the following formula.

Concentration of Transferred Trace=(White Area)/
(Black Area)

When the separator 20 and the positive electrode 30 are pressed under predetermined conditions by using a pair of heating plates, it is presumed that the same predetermined conditions result the same adhesion strength between the heat-resistant layer 32 and the adhesive 18.

The Examples will be described below in more specific.

<Production of Positive Electrode>

A positive electrode mixture layer was formed on both surfaces of an aluminum foil having a thickness of 13 μm. A thickness of the positive electrode mixture layer was set at 60 μm on one surface after compressive treatment. A length in the short direction of a positive electrode plate was set at 80 mm. A width (length in the short direction) of a current collecting tab part where a positive electrode core was exposed was set at 20 mm. A length in the longitudinal direction of the positive electrode plate was set at 140 mm. The positive electrode mixture layer included a lithium-nickel-cobalt-manganese composite oxide as the positive electrode active material, acetylene black as the conductive agent, and polyvinylidene fluoride (PVDF) as the binder at a mass ratio of 97:2:1.

The positive electrode may be produced by coating a positive electrode mixture slurry including the positive electrode active material, the conductive agent, the binder, and the like on the positive electrode core, and drying and subsequently compressing the coating film to form the positive electrode mixture layer on the positive electrode core. At this time, a speed for drying the coating film was changed to change distribution of acetylene black as the conductive agent in the thickness direction, resulting in change in the concentration of the porous material in the thickness direction. Specifically, a conventional positive electrode having a substantially uniform concentration of the porous material was produced by drying the coating film at the conventional drying speed. A positive electrode in Example having a nonuniform concentration of the porous material in the thickness direction and having acetylene black as conductive agent unevenly and relatively more distributed on the positive electrode surface was also produced by drying the applied film at an increased drying speed comparing to the conventional method. Regulating the drying speed (speed of evaporating moisture) during the dry of the positive electrode active material layer slurry changes a concentration distribution of the conductive agent in the positive electrode mixture layer. A higher speed of drying results a larger amount of the conductive agent included in a region near the positive electrode mixture layer surface.

More specifically, a drying condition in coating the positive electrode mixture slurry including the positive electrode active material, the conductive agent, and the binder was defined as a cumulative temperature calculated from a temperature difference between 25° C. as the reference temperature and a furnace temperature in the drying step, multiplied by a time (min.) required for passing the electrode plate through the furnace. The coated electrode plate was dried under the condition of the cumulative temperature of approximately 265° C.·min. when it passed through the entire drying step to produce the positive electrode plate in Example. As described later, a proportion of the porous material within a range of 5 μm from the surface layer of this positive electrode plate was 63.7%, which was 50% or more.

Similarly, a drying condition in coating the positive electrode mixture slurry including the positive electrode active material, the conductive agent, and the binder was defined as a cumulative temperature calculated from a temperature difference between 25° C. as the reference temperature and a furnace temperature in the drying step multiplied by a time (min.) required for passing the electrode plate through the furnace. The coated electrode plate was dried under the condition of the cumulative temperature of approximately 170° C.·min. when it passed through the drying step to produce the conventional positive electrode plate in Comparative Example. As described later, a proportion of the porous material within a range of 5 μm from the surface layer of this positive electrode plate was 10.8%, which was less than 50%.

In summary, the materials of the electrode mixture layer in Example and Comparative Example were same, and the speed of drying the positive electrode mixture slurry was changed as follows:

Example: approximately 265° C.·min.

Comparative Example: approximately 170° C.·min.

<Separator>

The separator used was produced by coating one surface of a polyethylene single layer substrate with a ceramic heat-resistant layer, and then coating both surfaces thereof with a dot-shaped adhesive layer made of an acrylic resin. In the separator, a thickness of the substrate layer was set at 12 μm, a thickness of the heat-resistant layer was set at 4 μm, and a width was set at 80 mm. Here, an amount of one dot of the adhesive was set to be substantially same. A dot number density of the adhesive was set to be substantially constant on one surface of the separator.

<Thermocompression Bonding Step>

On each of the sample using the positive electrode in Example and the sample using the conventional positive electrode, conditions of thermocompression bonding processing of the separator 20 and the positive electrode 30 were changed as follows.

(1) 74° C., 20 kN, 25 seconds (2) 74° C., 25 kN, 15 seconds (3) 74° C., 25 kN, 20 seconds (4) 74° C., 25 kN, 25 seconds (5) 74° C., 30 kN, 15 seconds <Evaluation of Adhesion Strength>

Each of the sample in Example and the conventional sample that were subjected to the thermocompression bonding under the above thermocompression bonding conditions (1) to (5) was sufficiently cooled after the thermocompression bonding, and then the separator 20 was removed from the positive electrode 30. The positive electrode 30 surface was photographed with a scanner to obtain an image, and this image was binarized to obtain a binarized image. On the binarized image, a concentration of a transferred trace was calculated with the following formula to be specified as an index of the adhesion strength.

Concentration of Transferred Trace=(White Area)/
(Black Area)

The white area is an area of the transferred heat-resistant layer, and the black area is a total area of the electrode plate. Thus, the above formula can be represented as follows.

Concentration of Transferred Trace=(Area of Trans-
    ferred Heat-Resistant Layer)/(Total Area of
    Electrode Plate)

Figure 5A:
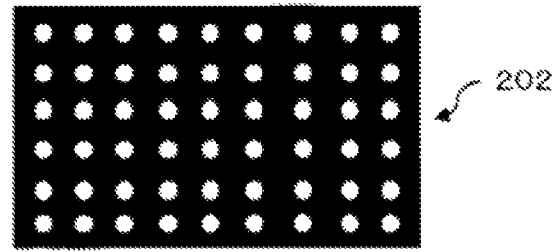
FIG. 5A is a view (part 1) illustrating a binarized image of a non-aqueous electrolyte secondary battery of Example.
Figure 5B:
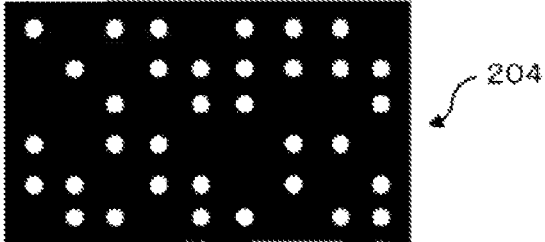
FIG. 5B is a view (part 2) illustrating a binarized image of a non-aqueous electrolyte secondary battery of Example.

FIG. 5A is an example of the binarized image of the sample in Example. FIG. 5B is an example of the binarized image of the conventional sample. In the sample in Example, a concentration of the conductive agent on the positive electrode 30 surface is relatively high, and a concentration of the porous material is relatively high; thus, the white area is relatively larger than that in the conventional sample.

Table 1 shows evaluation results of the adhesion strength when the thermocompression bonding is performed on each of the sample in Example and the conventional sample under the five conditions (1) to (5).

TABLE 1

| Conditions of thermocompression bonding processing | Concentration of transferred trace (uneven distribution of porous material on surface) | Concentration of transferred trace (uniform distribution of porous material) | Uneven distribution/ Uniform distribution |
|---|---|---|---|
| 74° C.-20 kN-25 sec. | 4,962 ppm | 3,037 ppm | 163% |
| 74° C.-25 kN-15 sec. | 2,662 ppm | 1,415 ppm | 188% |
| 74° C.-25 kN-20 sec. | 5,629 ppm | 5,381 ppm | 105% |
| 74° C.-25 kN-25 sec. | 20,014 ppm | 12,596 ppm | 159% |
| 74° C.-30 kN-15 sec. | 12,010 ppm | 3,430 ppm | 350% |

In Table 1, for example, when the thermocompression bonding was performed under the conditions of 74° C., 20 kN, and 25 seconds, the sample in Example had the concentration of the transferred trace of 4,962 ppm, that is, 0.4962%, whereas the conventional sample had the concentration of the transferred trace of 3,037 ppm, that is 0.3037%. Thus, a proportion of the adhesion strength of the sample in Example to that of the conventional sample was 163%.

Similarly, when the thermocompression bonding was performed under the conditions of 74° C., 25 kN, and 15 seconds, the sample in Example had the concentration of the transferred trace of 2,662 ppm, that is, 0.2662%, whereas the conventional sample had the concentration of the transferred trace of 1,415 ppm, that is, 0.1415%. Thus, a proportion of the adhesion strength of the sample in Example to that of the conventional sample was 188%. When the thermocompression bonding was performed under the conditions of 74° C., 25 kN, and 20 seconds, the sample in Example had the concentration of the transferred trace of 5,629 ppm, that is, 0.5629%, whereas the conventional sample had the concentration of the transferred trace of 5,381 ppm, that is, 0.5381%. Thus, a proportion of the adhesion strength of the sample in Example to that of the conventional sample was 105%. When the thermocompression bonding was performed under the conditions of 74° C., 25 kN, and 25 seconds, the sample in Example had the concentration of the transferred trace of 20,014 ppm, that is, 2.014%, whereas, the conventional sample had the concentration of the transferred trace of 12,596 ppm, that is, 1.2596%. Thus, a proportion of the adhesion strength of the sample in Example to that of the conventional sample was 159%. When the thermocompression bonding was performed under the conditions of 74° C., 30 kN, and 15 seconds, the sample in Example had the concentration of the transferred trace of 12,010 ppm, that is, 1.2010%, whereas, the conventional sample had the concentration of the transferred trace of 3,430 ppm, that is, 0.3430%. Thus, a proportion of the adhesion strength of the sample in Example to that of the conventional sample was 350%.

From these results, the adhesion strength of the sample in Example was confirmed to be higher than that of the conventional example under any thermocompression bonding conditions. Specifically, under the thermocompression bonding conditions of 74° C., 30 kN, and 15 seconds, the sample in Example was confirmed to have remarkably three times or more higher adhesion strength.

Next, EDX (energy dispersive X-ray spectroscopy) mapping was performed on the cross sections of the positive electrodes of the sample in Example and the conventional example. The electrode plate produced with an ion milling apparatus or the like was cut in the electrode plate thickness direction, and a cross-sectional image was photographed by using a SEM apparatus under a condition of an acceleration voltage of 3 kV to obtain a cross-sectional SEM image. Then, a carbon mapping was performed with EDX to obtain a porous material distribution in the thickness direction.

Figure 6:
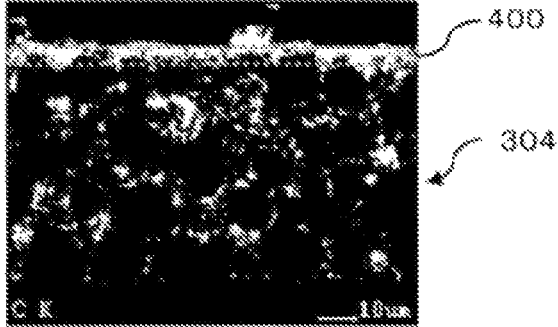
FIG. 6 is a view illustrating an evaluation method of a concentration of a porous material of a non-aqueous electrolyte secondary battery of Example.

In an EDX mapping image 304 of the sample in Example shown in FIG. 6, a porous object and a non-porous substance were coded with two colors, and then binarized. Acetylene black, which is the conductive agent, has a nonuniform concentration in the thickness direction, and the concentration of the conductive agent is relatively high on the positive electrode surface.

Figure 7:
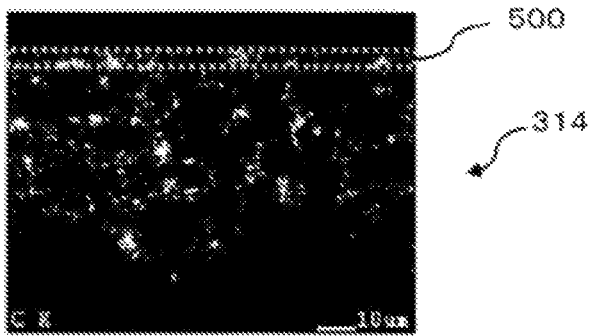
FIG. 7 is a view illustrating an evaluation method of a concentration of a porous material of a non-aqueous electrolyte secondary battery of Comparative Example.

In a EDX mapping image 314 of the conventional sample shown in FIG. 7, a porous object and a non-porous substance were coded with two colors, and then binarized, similarly to FIG. 6. Acetylene black, which is the conductive agent, has a substantially uniform concentration in the thickness direction, and the concentration is relatively low on the positive electrode surface comparing to the sample in Example.

To quantitatively evaluate the concentration of the conductive agent, that is, the concentration of the porous material, of the positive electrode surfaces in both the samples, counted was a proportion of the conductive agent on the positive electrode surfaces, more specifically, within a range of 5 μm from the surface of the positive electrode mixture layer.

As with the above concentration of the transferred trace, the concentration of the conductive agent, that is, the concentration of the porous material, within a range of 5 μm from the surface of the positive electrode mixture layer was calculated as a proportion between a white area and a black area in a binarized image as follows.

Concentration of Porous Material=(White Area)/
    (Black Area)

The results were as follows.

Sample in Example=63.7%

Conventional Sample=10.8%

It is to be noted that the concentrations of the transferred trace in Table 1 are concentrations in plane images of the positive electrode mixture layers, whereas the concentrations of the conductive agent in FIG. 6 and FIG. 7 are concentrations in images of the positive electrode mixture layers in the thickness direction.

To dominantly develop the anchor effect by adhering the porous material and the adhesive to allow the adhesive to enter the pores of the porous material, the porous material is desirably present as much as possible within the range of approximately 5 which is a range in the thickness direction presumed to be entered by the adhesive particles. It is presumed that the proportion of the porous material of 50% or more, which exceeds a proportion of other materials of the positive electrode mixture layer, can sufficiently develop the anchor effect. From the above, it can be stated that when the range of 5 μm from the surface of the positive electrode mixture layer is focused on, the concentration of the conductive agent, that is, the concentration of the porous material is preferably 50% or more, and more preferably 60% or more.

REFERENCE SIGNS LIST

10 Positive electrode core
12 Positive electrode mixture layer
14 Layer having relatively low concentration of porous material
16 Layer having relatively high concentration of porous material
18 Adhesive
20 Separator

The invention claimed is:

1. A non-aqueous electrolyte secondary battery, comprising:
   a separator having an adhesive of a single type on at least one surface thereof; and
   an electrode having a core and an electrode mixture layer, the electrode mixture layer contacting the adhesive, wherein
   in the electrode mixture layer, a concentration of a porous material in a thickness direction increases from the core to the adhesive,
   the adhesive has entered into pores of the porous material of the electrode mixture layer, and
   in the electrode mixture layer, a proportion of the porous material within a range of 5 μm from a surface of the electrode mixture layer on a side of the adhesive is 63.7% or more.

2. The non-aqueous electrolyte secondary battery according to claim 1, wherein
   the electrode mixture layer is a positive electrode mixture layer including a positive electrode active material, and
   the porous material is a conductive agent.

3. The non-aqueous electrolyte secondary battery according to claim 1, wherein a heat-resistant layer is disposed on the separator or the electrode.

4. The non-aqueous electrolyte secondary battery according to claim 1, wherein the adhesive is one selected from the group consisting of an acrylic resin-based adhesive, a urethane resin-based adhesive, an ethylene-vinyl acetate resin-based adhesive, and an epoxy resin-based adhesive.

5. The non-aqueous electrolyte secondary battery according to claim 4, wherein the adhesive is the acrylic resin-based adhesive.

* * * * *